(12) United States Patent
Coward et al.

(10) Patent No.: US 11,387,899 B1
(45) Date of Patent: Jul. 12, 2022

(54) BEACON MULTIPLEXING FOR ALIGNMENT OF FREE SPACE OPTICAL COMMUNICATION TERMINALS

(71) Applicant: SA Photonics, Inc., Los Gatos, CA (US)

(72) Inventors: James F. Coward, Washougal, WA (US); William C. Dickson, Granville, OH (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 17/484,314

(22) Filed: Sep. 24, 2021

Related U.S. Application Data

(60) Provisional application No. 63/083,013, filed on Sep. 24, 2020.

(51) Int. Cl.
*H04B 10/00* (2013.01)
*H04B 10/112* (2013.01)
*H04N 7/22* (2006.01)
*H04J 14/00* (2006.01)

(52) U.S. Cl.
CPC .......... *H04B 10/1121* (2013.01); *H04N 7/22* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| | | | | |
|---|---|---|---|---|
| 2008/0044188 A1* | 2/2008 | Kagawa | ............. | H04B 10/1141 398/128 |
| 2018/0351653 A1* | 12/2018 | Bortz | ........................ | G02F 1/31 |

* cited by examiner

*Primary Examiner* — Daniel G Dobson
(74) *Attorney, Agent, or Firm* — Fenwick & West LLP

(57) ABSTRACT

A local free space optical (FSO) terminal senses an external environment that includes at least two beacons transmitted from a remote FSO terminal. The local terminal is configured to sense the beacons at a frame rate. Each beacon comprises a pulse train with pulses that are transmitted at a pulse rate. The pulse trains are temporally offset relative to each other so that pulses from at least one of the pulse trains do not fall across frame boundaries during sensing, regardless of a temporal location of the frame boundaries. In addition to detecting the at least two beacons, the local terminal is configured to identify the beacon that contains pulses that do not fall across the frame boundaries, and adjust its orientation based on the identified beacon.

20 Claims, 9 Drawing Sheets

BEACON MULTIPLEXING FOR ALIGNMENT OF FREE SPACE OPTICAL COMMUNICATION TERMINALS

CROSS-REFERENCE TO RELATED APPLICATION

This application claims priority under 35 U.S.C. § 119(e) to U.S. Provisional Patent Application Ser. No. 63/083,013, "Beacon/Camera Setup to Increase Sensor Readout Rate—Toward Full Camera Frame Rate Sensor Update Rate," filed on Sep. 24, 2020, the subject matter of which is incorporated herein by reference in its entirety.

BACKGROUND

1. Technical Field

This disclosure relates generally to free space optical (FSO) communications, and more particularly, to aligning FSO terminals using two or more beacons.

2. Description of Related Art

FSO communications is a communications technology that uses light propagating in free space to wirelessly transmit data, for example, for telecommunications or computer networking. Free space is a communications medium that can include air, outer space, or vacuum and contrasts with guided wave communications, such as optical fibers. FSO technology is useful where physical connections are impractical due to high costs or other considerations. In contrast with other electromagnetic communications means, FSO signals are more directional ("FSO signals" refers to light propagating between terminals). The directionality confers benefits both for communications capacity and for communications privacy.

However, high directionality demands accurate beam pointing between terminals and renders communication unpredictable if the FSO beams miss their intended targets. For example, if an FSO terminal is mounted on a tower, strong winds may move the tower such that the FSO terminal sways with the tower. In another example, an FSO terminal is mounted on a flying vehicle that communicates with a stationary FSO terminal. In these and similar situations, high directionality may require rapid adjustment and accurate pointing to establish and maintain a reliable FSO communication link.

SUMMARY

FSO terminals perform optical acquisition and tracking to communicate with each other. To establish and maintain a communication link, a remote FSO terminal emits a beacon and a local FSO terminal includes a detector. The local terminal senses the beacon, measures the direction to the beacon relative to the boresight of the detector, and uses that directional information to acquire, point to, and track the beacon. To make the beacon distinguishable over other background light sources, the remote terminal modulates the beacon. The local terminal then compares frames captured by the detector to identify and detect the modulated beacon.

To reduce or avoid beacon pulses from falling on frame boundaries (which reduces the modulation depth at the detector), embodiments relate to a local FSO terminal that senses an external environment that includes at least two beacons transmitted from a remote FSO terminal. The local terminal senses the beacons at a frame rate. Each beacon comprises a pulse train with pulses that are transmitted at a pulse rate. The pulse rate is equal to the frame rate of the detector divided by N, where N is an integer greater than or equal to two. The pulse trains are temporally offset relative to each other so that pulses from at least one of the beacons do not fall across frame boundaries during sensing, even if a temporal location of the frame boundaries is not known. The local terminal identifies the beacon that contains pulses that do not fall across the frame boundaries, and adjusts its orientation based on the identified beacon.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

FSO Communication Terminals

Figure 1A:
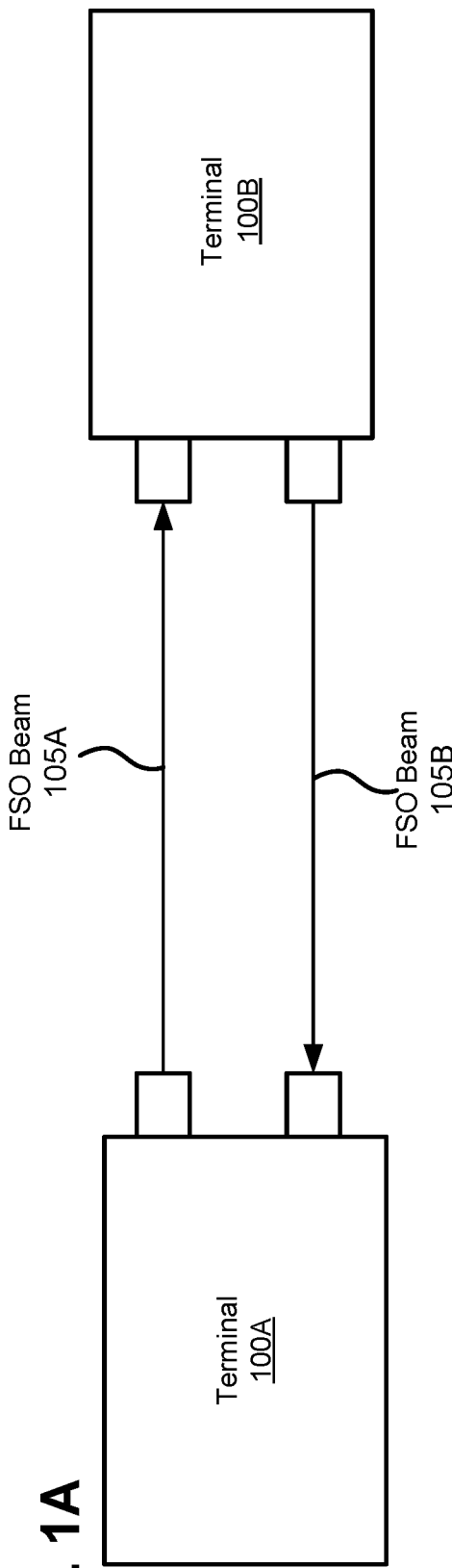
FIGS. 1A and 1B illustrate block diagrams of FSO terminals communicating via FSO communication links.
Figure 1B:
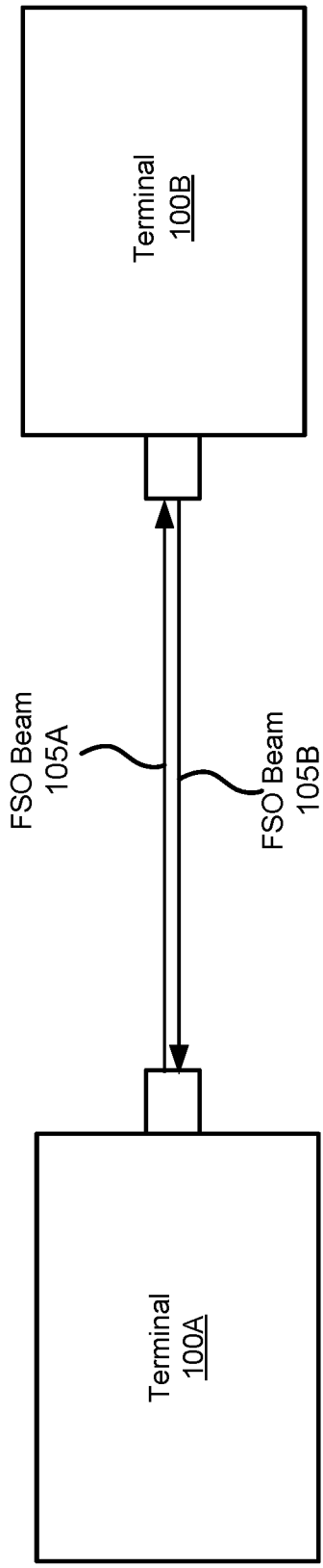

FIGS. 1A and 1B are block diagrams of terminals 100A and 100B (also referred to as nodes) communicating via free space optical (FSO) communication links. Specifically, the terminals 100 are communicating by transmitting and receiving data-encoded FSO beams 105. In FIG. 1A, each terminal 100 receives and transmits FSO beams 105 through different apertures, while in FIG. 1B, the terminals are co-boresighted so that beams are received and transmitted though the same aperture. In the co-boresighted approach, the same primary optical system may carry signals both for Tx and Rx paths, reducing weight and complexity of separate optical components for Tx and Rx beams. A co-boresighted optical design also simplifies the system and enhances reliability by eliminating separate pointing and tracking mechanisms for Tx and Rx. As described herein, if terminal 100A is referenced as a local terminal, terminal 100B may be referred to as a remote terminal, beam 105A may be referred to as a transmit (Tx) beam, and beam 105B may be referred to as a receive (Rx) beam.

As illustrated, the terminals 100 are aligned with each other. This results in the data-encoded FSO beams being received by the apertures of the receiving terminals 100. Aligning FSO terminals so that they direct their beams toward each other may include a beam acquisition process.

The optical beam used for the beam acquisition process may be referred to as a beacon. A beacon may also be used during other alignment processes, such as during a beam tracking process, which helps maintain alignment as data-encoded FSO beams are transmitted and received. Note that beam tracking may require a faster readout rate than beam acquisition so a beacon may be used for beam tracking only if the sampling rate is above a threshold value (e.g., 30 Hz). A beacon beam may be a separate beam than the FSO beams used to transmit data. As further described below, to decrease alignment time (e.g., during acquisition or tracking), a terminal 100 may emit multiple modulated beacons and adjust a temporal offset between the beacons.

Alignment Process

Figure 2A:
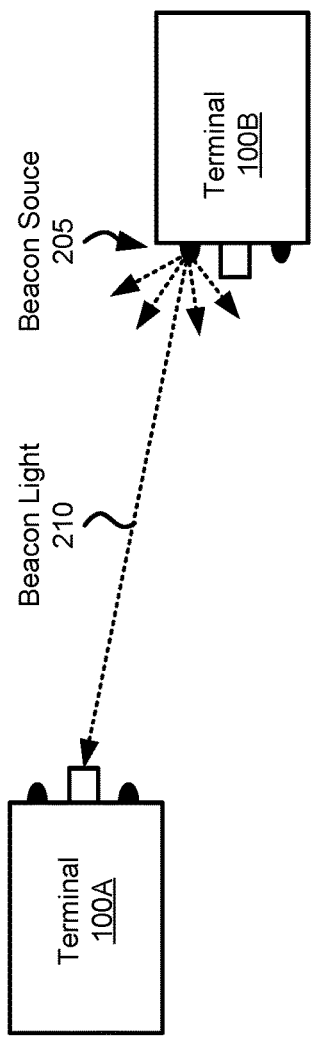
FIGS. 2A-2C illustrate how a local FSO terminal uses a beacon to align itself with a remote FSO terminal.
Figure 2B:
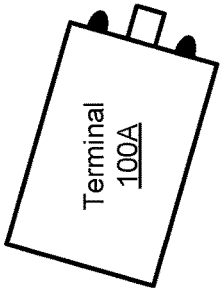
Figure 2C:
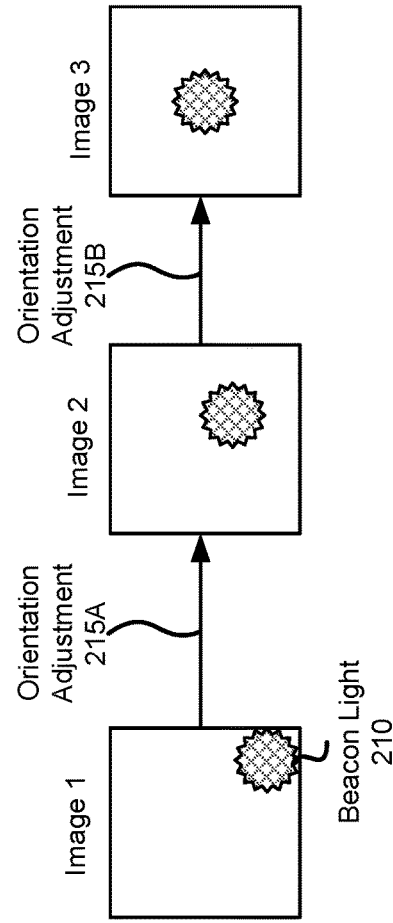

FIGS. 2A-2C illustrate how a local terminal 100A uses a beacon to align itself to a remote terminal 100B. FIGS. 2A-B illustrate two terminals 100. Terminal 100B includes a beacon source 205 that emits beacon light 210. In FIG. 2A, terminal 100A is misaligned with terminal 100B. Terminal 100A receives the beacon light 210. Terminal 100A adjusts its orientation based on the direction or location of the received beacon light 210. In FIG. 2B, after adjustment, terminal 100A is now pointing towards terminal 100B. Although not illustrated, terminal 100B may also adjust its orientation, for example, based on beacon light emitted from terminal 100A.

FIG. 2C illustrates an alignment process from the perspective of terminal 100A. FIG. 2C includes a series of images captured by a detector of terminal 100A, such as a camera. Each image includes beacon light 210 emitted by the source 205. In image 1, the beacon 210 is in the lower right-hand corner. In image 2 captured at a later time, the beacon 210 is closer to the center of the image. In image 3 at an even later time, the beacon 210 is in the center of the image, which position indicates that terminal 100A is now aligned with terminal 100B.

Terminal 100A analyzes (e.g., via a controller module) a first set of captured images (e.g., including image 1) to identify the beacon light 210. For example, the beacon light 210 may be modulated at a certain frequency (AC modulation) so that over a sequence of images, pixels that vary at the same frequency may be identified as the beacon 210. In this example, the identified beacon light 210 is located in the lower corner of image 1. This indicates that terminal 100A is misaligned with the remote terminal 100B. For example, image 1 was captured by terminal 100A in FIG. 2A. In response to this, the terminal adjusts 215A its orientation based on the position of the identified beacon to better align itself. For example, the terminal rotates downward and to the right. Image 2 is captured in the new orientation. The beacon 210 is now closer to the center, which means that the terminal 100A is better aligned than before. A second set of images (e.g., including image 2) are analyzed like the first set and the terminal adjusts 215B its orientation again based on the new beacon location. Image 3 is captured at the new orientation compared to image 2. The beacon 210 is now in the center of the image, which indicates that terminal 100A is now aligned with terminal 100B (e.g., as in FIG. 2B).

In some embodiments, terminal 100A includes a reflector (e.g., mirror) that reflects at least a portion of the light 210 back towards terminal 100B. The mirror effectively functions as a virtual beacon source on terminal 100A. In these embodiments, terminal 100B may capture images of the reflected light and adjust its orientation as described above.

The above description includes several assumptions to provide a simplified explanation of the alignment process. For example, it assumes that the terminals 100 are stationary relative to each other (ignoring the orientation adjustments). Terminal 100A may adjust its orientation differently if the terminals 100 are moving relative to each other. It also assumes that terminal 100A aims to align itself so that the beacon 210 is centered in a detector image (e.g., as in image 3). Depending on the location of source 205 on terminal 100B and the distance between the terminals 100, alignment may not correspond to a centered beacon. For example, terminal 100A may be aligned when the beacon 210 is at another location in the image (e.g., 20 pixels above the center).

FSO Terminal Components

Figure 3:
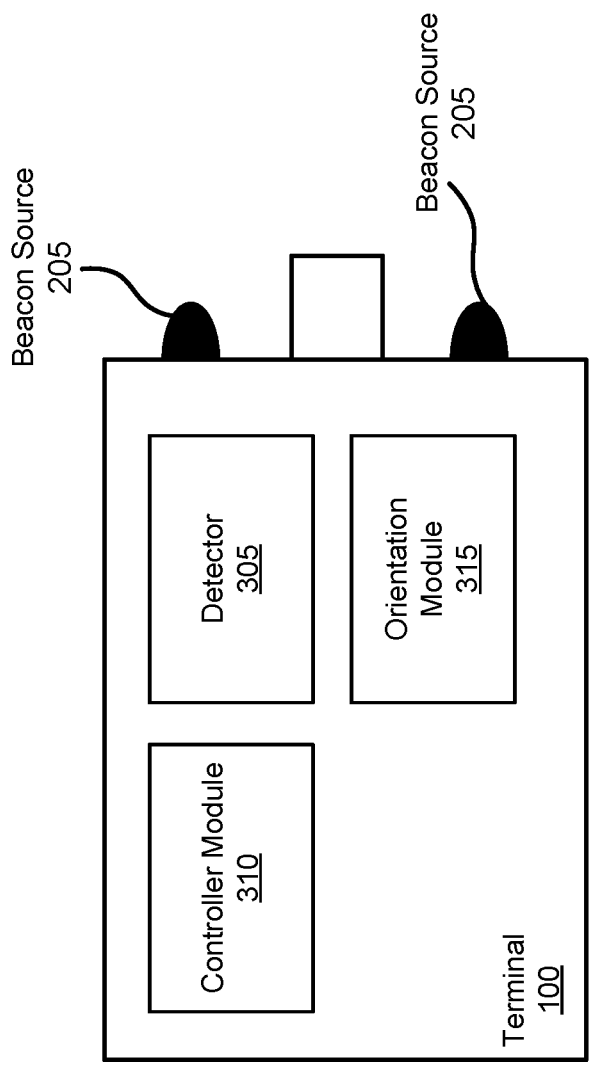
FIG. 3 illustrates beacon components of an FSO terminal.

FIG. 3 is a block diagram of an FSO terminal 100. The terminal 100 includes beacon sources 205, a detector 305 such as a camera, a controller module 310, and an orientation module 315. The terminal 100 may include additional, fewer, or different components than those illustrated. For example, the terminal 100 includes additional components related to communicating data over an FSO link, such as a modem, a laser, fiber optic cables, a beam steering unit, and a telescope.

The beacon source 205 is a light source that emits a beacon, such as a light emitting diode (LED). In some arrangements, the light source maybe amplified by an Erbium-Doped Fiber Amplifier (EDFA). A light source 205 may emit light of any wavelength. However, light in the visible or near-infrared bands between 380 nm and 1000 nm wavelength is most common and may be preferred. In some embodiments, a beacon source 205 is wavelength tunable so that it can emit beacons at different wavelengths.

The terminal 100 may include multiple beacon sources 205. In the example of FIG. 3, the terminal 100 includes two beacon sources 205. However more sources (e.g., four or more) are also possible and may enhance the angular range over which a remote terminal can "see" the beacon. Each source 205 may be spatially separated from the other sources 205 (e.g., enough to be distinguishable by a remote terminal). Separation distance may be selected on the basis of range between the local and remote terminals as well as the expected angular resolution of the remote detector, so that the detector is able to resolve the separation between sources 205. If the terminal 100 includes multiple sources 205, the sources may emit beacons of different wavelengths (e.g., different colors). Spatially separating the sources 205 and emitting beacons of different wavelengths may make each beacon distinguishable over the other beacon sources 205.

In the example of FIG. 3, the beacon sources 205 are externally mounted to the terminal 100. In other embodiments, one or more sources 205 are inside the housing and the beacon exits the terminal 100 via an aperture. In these embodiments, the beacon may be directed along a direction e.g., by a beam steering unit.

As previously described, a beacon is used during a beam acquisition process to establish an FSO communication link and may also be used during a tracking mode to maintain the FSO communication link. As a result, beacons typically have larger divergences than data-encoded FSO beams. For example, the divergence of a beacon may be two to four times larger than the divergence of a data-encoded FSO beam (however larger and smaller ratios are also possible). The amount of divergence may depend on the application for the terminal 100.

Beacons emitted by the sources 205 may be modulated, i.e., pulsed rather than continuous wave. This results in a source 205 emitting a series of pulses that form a pulse train. The pulses may be emitted at a pulse rate (also referred to as pulse frequency). The pulse rate may be related to a frame rate of the detector 305 and used to detect the pulses. To create a consistent and detectable modulated beacon, the pulse rate may be equal to the frame rate divided by N, where N is an integer equal to or greater than two. However, other frequencies may be used (e.g., frequencies not related to the frame rate). In some embodiments, the number of beacons (and thus the number of sources 205) is based on N. For example, the number of beacons is greater than N. In another example, the number of beacons is equal to 2N. As further described below, modulated beacons and using a number of beacons based on N may increase the effective sampling rate for aligning the terminals.

The detector 305 converts electromagnetic waves, such as a beacon pulse, into electrical current. The detector 305 may be a camera. For example, the detector 305 includes an image sensor (with pixels) that captures images of light, such as a charge-coupled device (CCD) or an active-pixel sensor (e.g., a CMOS sensor). Additionally or alternatively, the detector 305 may be a photodetector or other electromagnetic wave detector. The detector 305 may be capable of detecting different types of light signals, e.g., low and high light intensities, specific wavelengths, etc. This allows the terminal 100 to operate in low light (e.g., at night) and high light situations (e.g., at mid-day).

The detector 305 senses the external environment (e.g., captures images) at a frame rate. Example frame rates include 60 frames per second (fps) and 120 fps. Each frame is defined by frame boundaries that define the start and end times of the frame capture. As further described below, the temporal location of frame boundaries relative to the temporal location of a beacon pulse train may affect the amount of modulation that is detectable and, consequently, the certainty with which beacons may be identified within captured images. Some embodiments may be configured to change pulse rates and frame rates adaptively. For example, many cameras support higher frame rates at lower resolution, and terminals 100A and 100B may be both configured to select alternate rates appropriate for operating conditions such as interfering ambient light, range between stations, and other conditions.

In the example of FIG. 3, the detector 305 is inside the terminal housing. Thus, the detector 305 detects light that propagates through an aperture of the housing. For example, a beacon propagates through the same optics as the data-encoded FSO beams. In these embodiments, the detector 305 may also be used to detect the data-encoded FSO beams. In other embodiments, the detector 305 is mounted outside of the terminal housing.

The controller module 310 receives information from the detector 305 (e.g., image data), identifies a beacon in the received signals and determines orientation adjustment instructions based on the identified beacon (e.g., it determines a location of a remote terminal based on the beacon and uses the location to determine the orientation adjustment). The controller 310 then provides instructions (e.g., to the orientation module 315) to better align the local terminal with the remote terminal. If multiple beacons are detected, the controller 310 may identify the individual beacons (e.g., by separately identifying the individual pulse trains within the captured image data) and determine orientation adjustments based on the aggregate information provided by multiple beacons.

To identify a modulated beacon in a series of images, the controller 310 may compare images captured by the detector (e.g., using frame differential detection). For example, pixel values of an image associated with a frame are subtracted from pixels values of an image associated with a subsequent or previous frame (or both) to cancel out any background light and identify a beacon pulse. Additionally or alternatively, the modulation depth of a potential beacon may be determined (e.g., based on the pixel values). If the modulation depth is larger than a threshold value, then a beacon may be identified. If multiple beacons are detected, the controller 310 may distinguish (e.g., separate) the beacons based on wavelength or spatial location in a captured image. For example, clusters of modulated red pixels may be identified as pulses of a first red beacon, and clusters of modulated blue pixels may be identified as pulses of a second blue beacon. Multiple sources may also be distinguished by temporal modulation e.g., distinguishing pulse rates, pulse durations, or timing offsets between pulses of different sources. More complex modulations, including amplitude variation and wavelength differences, are also possible that may carry beacon identification information.

In some embodiments, instead of comparing frames to identify a beacon, groups of one or more pixels from a single frame may be compared. These embodiments may be relevant when the pulse rate is comparable to the capture time of a group of pixels instead of frames. For example, if a first pulse of a pulse train is captured by a first row of pixels and a second pulse of the pulse train is captured by a second row of pixels (assuming a rolling shutter mode), the first and second rows of pixels may be compared to identify the beacon.

The rate at which the controller 310 samples and corrects the misalignment between terminals may be referred to as the misalignment sampling rate. Each beacon provides samples of the misalignment, and the misalignment sampling rate for an individual beacon may be described relative to the detector frame rate (e.g., it is half the frame rate). The misalignment sampling rate for the terminal as a whole is based on the samples from all beacons and may be faster than the detector frame rate. The misalignment sampling rate affects the orientation adjustment rate of the orientation module 315. In some embodiments, the orientation adjustment rate is equal to the misalignment sampling rate. Thus, to decrease align time between terminals, it is advantageous to increase the misalignment sampling rate. This can be done by increasing the number of beacons.

The controller 310 also controls the beacon sources 205 to emit the beacons. For example, the controller 310 sets timing properties of the beacons, such as the beacon pulse rate, duty cycle, and the temporal offset between beacons. The controller 310 may also adjust the timing properties during the alignment process. For example, after terminals are aligned, the remote terminal 100B may communicate (e.g., via FSO beams) beacon feedback information and the controller 310 may adjust one or more timing properties based on the feedback information. This is described further with respect to FIGS. 7A-8B.

The orientation module 315 changes an orientation of the FSO terminal 100 based on control signals from the controller 310. The orientation module 315 may change the orientation of the entire terminal 100 or a subset of components of the terminal 100. For example, the orientation module 315 is a gimbal system that changes the orientation of a platform that supports the detector 305 and beacon sources 205. In some embodiments, the orientation module 315 includes a beam steering unit (BSU) that directs FSO beams to the remote terminal 100.

Example Modulation Schemes

As previously described, it may be advantageous to modulate a beacon to make it detectable in the captured images. Several modulation schemes are described below with respect to FIGS. 4A-8B. These figures include timing diagrams (the "A" figures) and a series of corresponding images captured by a detector (the "B" figures). The timing diagrams illustrate frame boundaries of the detector 305 relative to received beacon pulses. The images in the "B" figures correspond to the timing diagrams: image 1 is the image captured during frame 1, image 2 is the image captured during frame 2, etc. In these "B" figures, for purposes of illustration, the pulses are shown as either present or not present in each captured image and "detectable modulation" is represented by a beacon that is alternating between present and not present in consecutive images. In addition, background light is not shown in the captured images and the images do not illustrate any grayscale brightness of the pulses. In reality, pulses are captured in the detector images with different brightness levels depending on the pulse duration in each frame, and images will also capture background light. Other techniques, such as frequency filtering, may be used to detect the modulated beacon in the presence of background light.

Figure 4A:
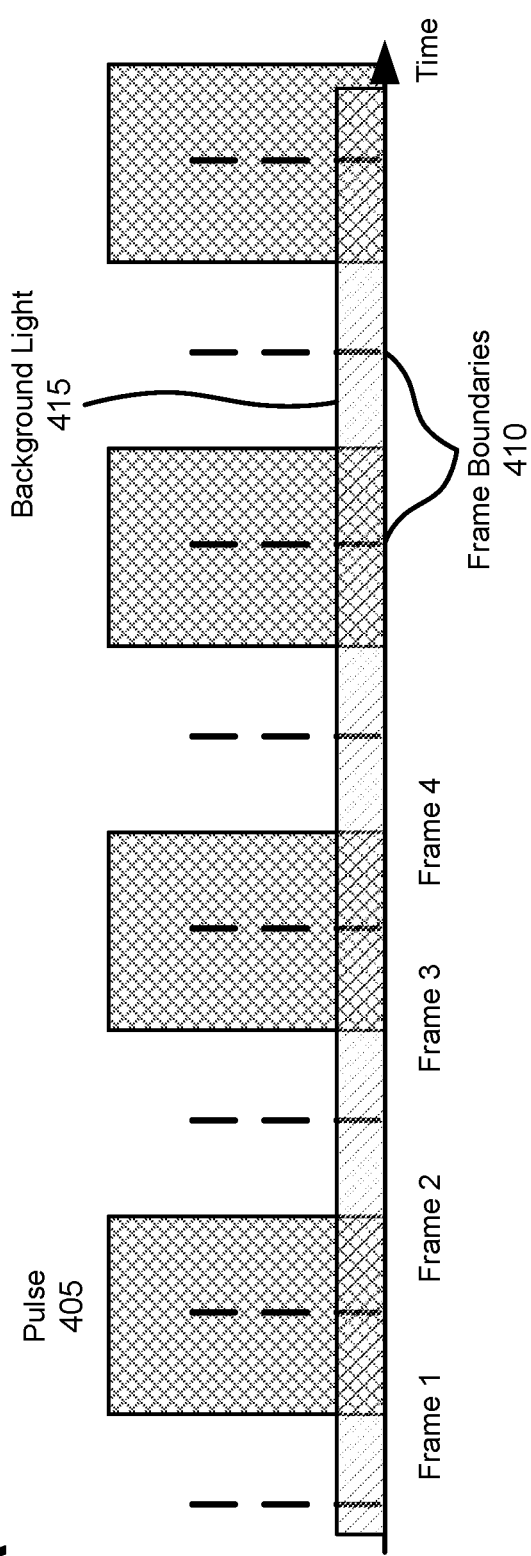
FIGS. 4A-8B illustrate example beacon modulation schemes.
Figure 4B:
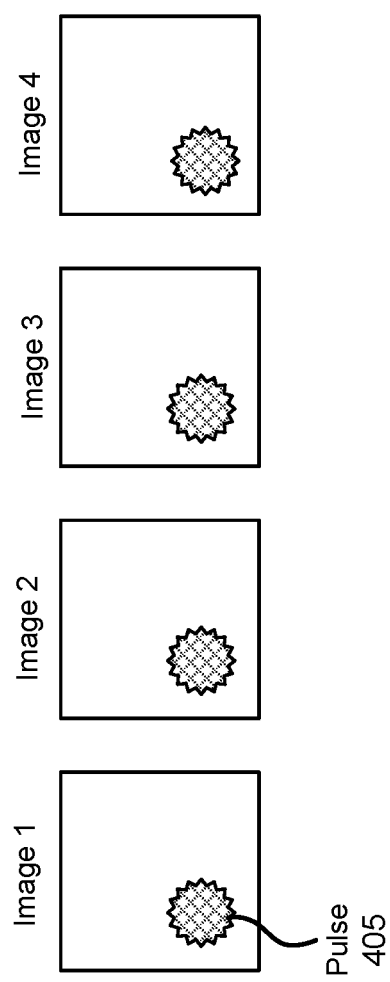

In FIG. 4A, beacon pulses 405 are emitted by a single source. The pulse rate is equal to half the frame rate, and the pulse train has a 50% duty cycle. Each pulse has the same duration as a single frame. The pulses 405 fall on frame boundaries 410, resulting in each image including a portion of a pulse (see FIG. 4B). Because of this, FIG. 4B illustrates an ineffective modulation scheme (even for other duty cycles). Although the beacon is pulsed, the controller 310 cannot detect any modulation and may not distinguish (e.g., with a threshold confidence level) pulses 405 in the images over the background light 415 (e.g., from the sun) because the pulses are recorded in every image without any modulation.

This modulation scheme would be useful if the pulses 405 were aligned between the frame boundaries 410 (resulting in a pulse in each alternate frame). However, the temporal location of the frame boundaries 410 relative to the pulses is generally unknown and may change over time. Thus, the scenario shown in FIG. 4A is just as likely to occur and detection of the pulses cannot be guaranteed.

Figure 5A:
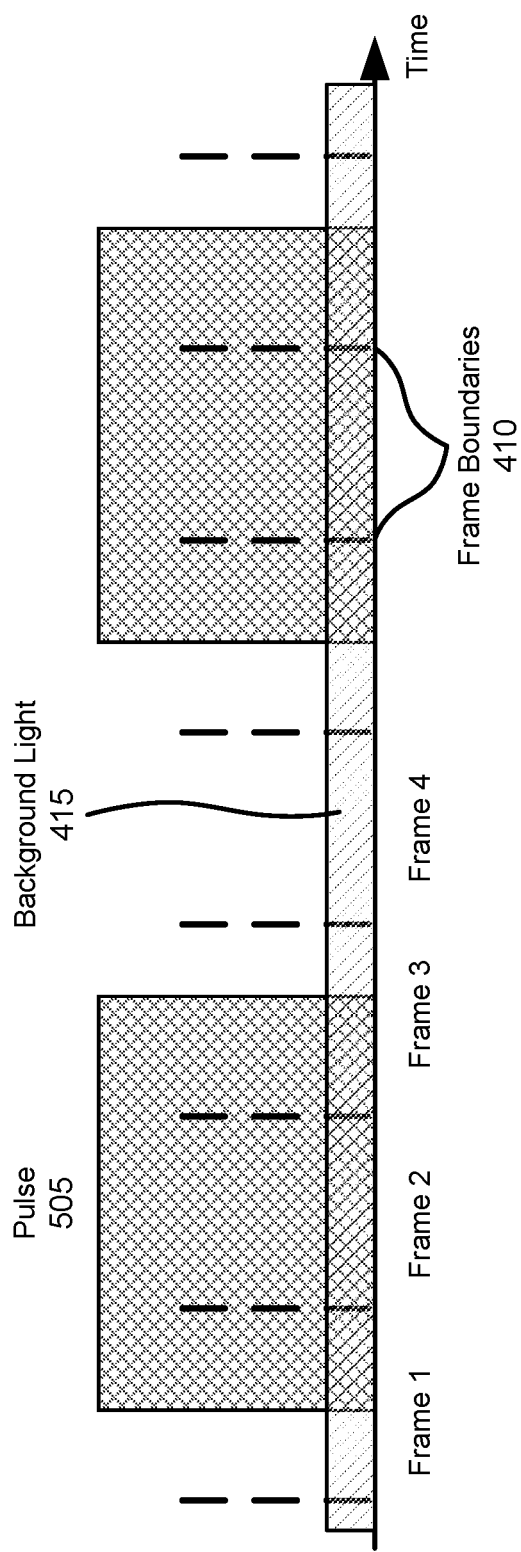
Figure 5B:
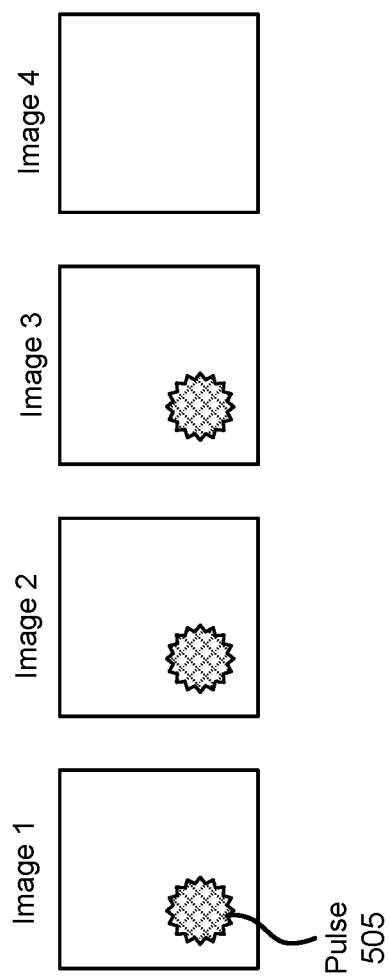

To avoid the above issues, the pulse rate of the beacon may be decreased. In FIG. 5A, the beacon has a pulse rate equal to one fourth the frame rate. Similar to the previous modulation scheme, the beacon is emitted by a single source and has a 50% duty cycle. Each pulse 505 has a width of two frames and crosses two frame boundaries 410, resulting in each pulse fully filling one frame (frame 2), partially filling the two neighboring frames (frames 1 and 3), and not filling a fourth frame at all (frame 4). Regardless of the location of the frame boundaries 410, this scheme guarantees that every group of four sequential frames includes at least one frame that is fully filled by a pulse (frame 2) and at least one frame without any pulse (frame 4). Thus, the modulated beacon may be identified over the background light 415. However, the scheme is still inefficient because the misalignment sampling rate of this beacon is only one fourth of the frame rate.

Figure 6A:
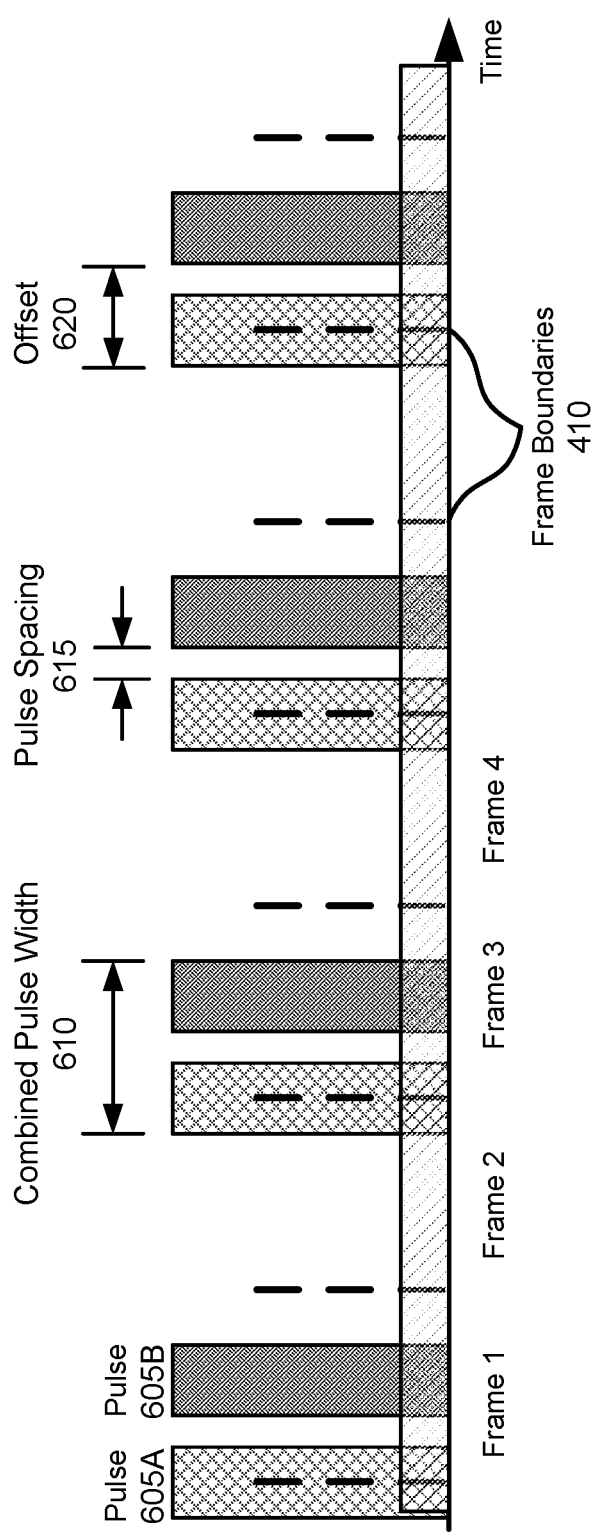

To increase the misalignment sampling rate, multiple beacons may be used. FIG. 6A illustrates a timing diagram with two beacons (e.g., emitted by two different beacon sources). Pulses 605A of the first beacon are illustrated with cross hatching, and pulses 605B of the second beacon are illustrated with a dense dot pattern. Both beacons have a pulse rate equal to half the frame rate and a duty cycle of 20%. At this duty cycle, each pulse has a width that is less than half the frame width. The beacons are temporally offset relative to each other (i.e., they are out of phase) and pulses 605A do not overlap with pulses 605B (however, in some embodiments, pulses may overlap). Additionally, the time from a leading edge of a first beacon pulse (e.g., pulse 605A) to a trailing edge of a corresponding second beacon pulse (e.g., pulse 605B) ("combined pulse width 610") is less than the frame period (although it may be equal to the frame period). Under these conditions, at least one of the two pulse trains 605A,B will not fall across frame boundaries 410, regardless of where the frame boundaries are located. In the example shown, the first beacon pulses 605A fall on frame boundaries 410. Thus, these pulses 605A exhibit less modulation in the captured images 1-4. The second beacon pulses 605B do not fall on frame boundaries 410 and are recorded only in images 1 and 3 and not in images 2 and 4. This creates a high pulse modulation depth when images 1 and 3 are compared with images 2 and 4. Due to this, pulses 605B may be identified in the images. Depending on the modulation depth of pulses 605A across images 1-4, these pulses may or may not be identified in the images.

Regardless of the locations of the frame boundaries 410, this scheme results in at least one beacon not falling across the frame boundaries 410 (in this case, the beacon pulses 605B). For this beacon, every group of two sequential frames includes a frame with a pulse and a frame without a pulse. Thus, the misalignment sampling rate is at least doubled compared to the modulation scheme of FIGS. 5A and 5B. Due to the increased misalignment sampling rate, the modulation scheme of FIGS. 6A and 6B may be used for beam tracking in addition to beam acquisition (the previous schemes may not be fast enough for acquisition).

Other modulation schemes with two beacons may achieve a similar result. For example, the beacons do not need to have the same duty cycle, and a duty cycle may be less than 50% or 25%. In another example, different combined pulse widths 610 and different pulse spacings 615 may be used. For example, the combined pulse width 610 may be larger than the frame period but less than two frame periods. In these cases however, the pulse spacing 615 may also be equal to or larger than the frame period to ensure that at least one pulse does not fall across frame boundaries 410, regardless of the location of the frame boundaries 410.

Figure 6B:
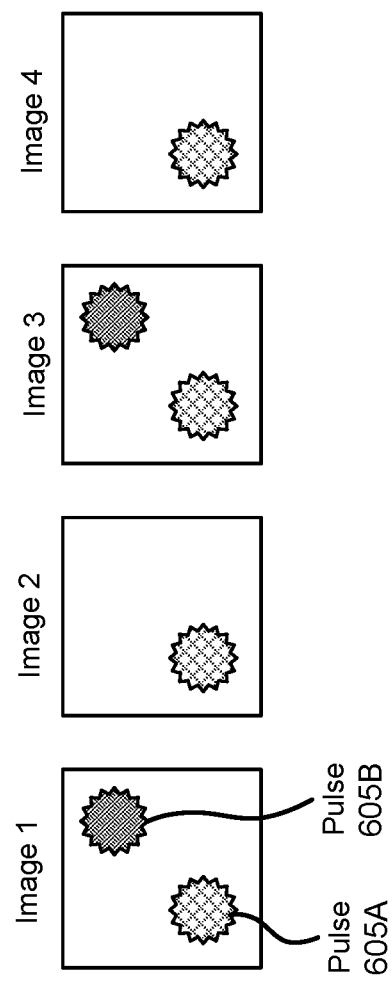

As previously described, the beacon sources may be physically separated enough that beacons are captured by different pixels of the detector. This is illustrated in the images of FIG. 6B. For example, pulse 605A is captured by one set of pixels of the camera and pulse 605B is captured by a different set of pixels. Additionally or alternatively, the beacons may be different wavelengths. For example, pulse 605A is red and pulse 605B is blue.

In some embodiments, the average power of each beacon is limited, as opposed to limiting the power of each pulse (e.g., due to safety considerations). Since the duty cycle in FIG. 6A is smaller than the duty cycles in FIGS. 4A and 5A, the pulse power may be increased (e.g., doubled). This may further help distinguish pulses over the background light 415.

Figure 7A:
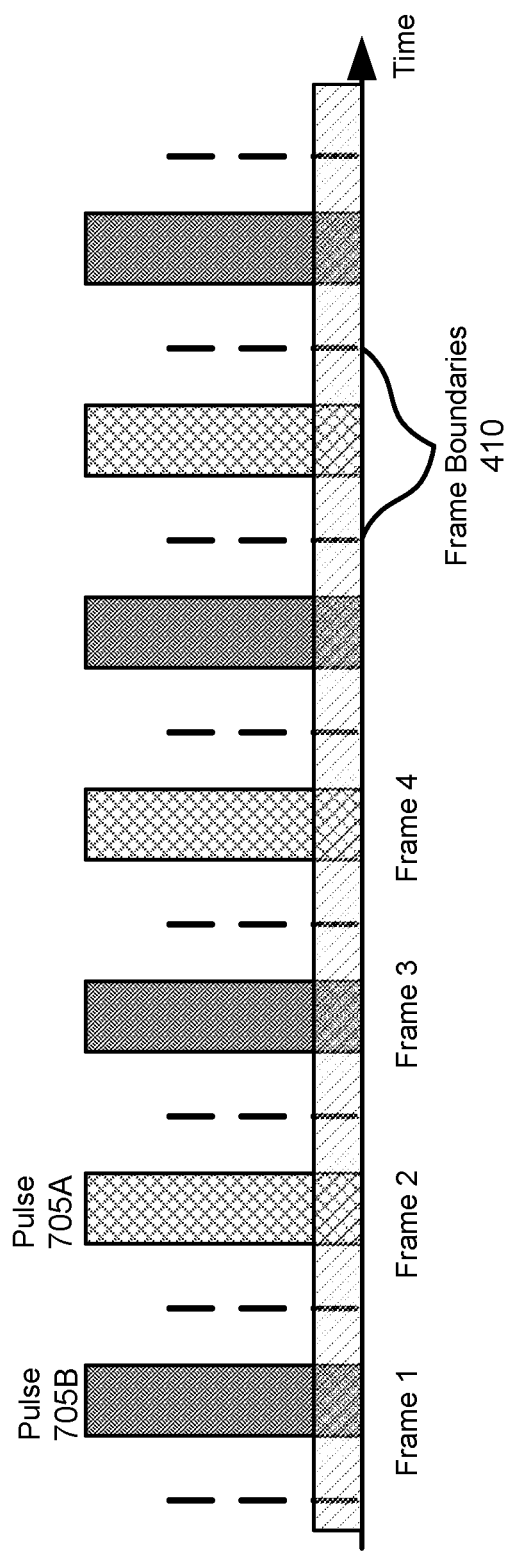
Figure 7B:
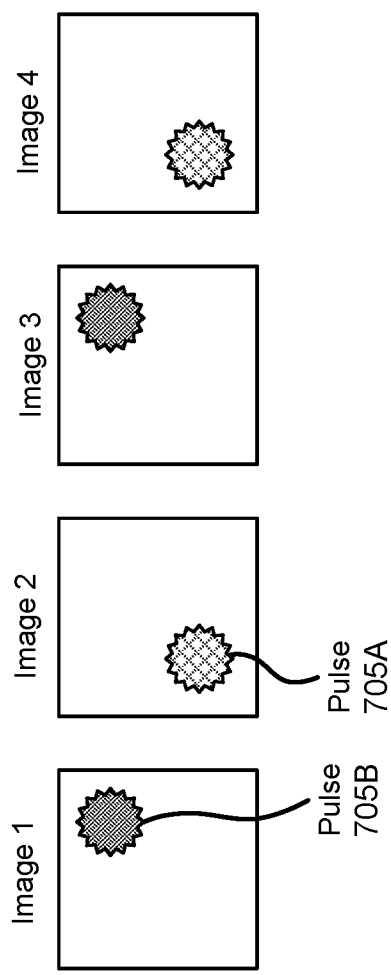

As previously mentioned, in some embodiments, after a communication link is established between terminals 100, beacon feedback may be transmitted (e.g., via data-encoded FSO beams). This feedback may be used to adjust the offset 620 of the beacons, the temporal location of the frame boundaries 410, or any other timing properties so that both pulses fall between the frame boundaries 410. An example result of this is illustrated in FIGS. 7A and 7B. FIG. 7A illustrates a timing diagram with two beacons, similar to FIG. 6A. However, pulses of the pulse trains fall in alternating frames. Thus in FIG. 7A, pulses 705A are recorded in images 2 and 4 and pulses 705B are recorded in images 1 and 3. By interleaving the beacon pulse trains, the misalignment sampling rate may be increased to equal the frame rate (even though the individual beacons only have frequencies equal to half of the frame rate). Thus, the misalignment sampling rate is doubled compared to the modulation scheme of FIGS. 6A and 6B.

Although FIG. 7B illustrates the beacons falling in alternate frames, adjustments may be performed to create other modulation schemes. For example, the beacon timing may be adjusted so that both beacons fall within the same frame.

Figure 8A:
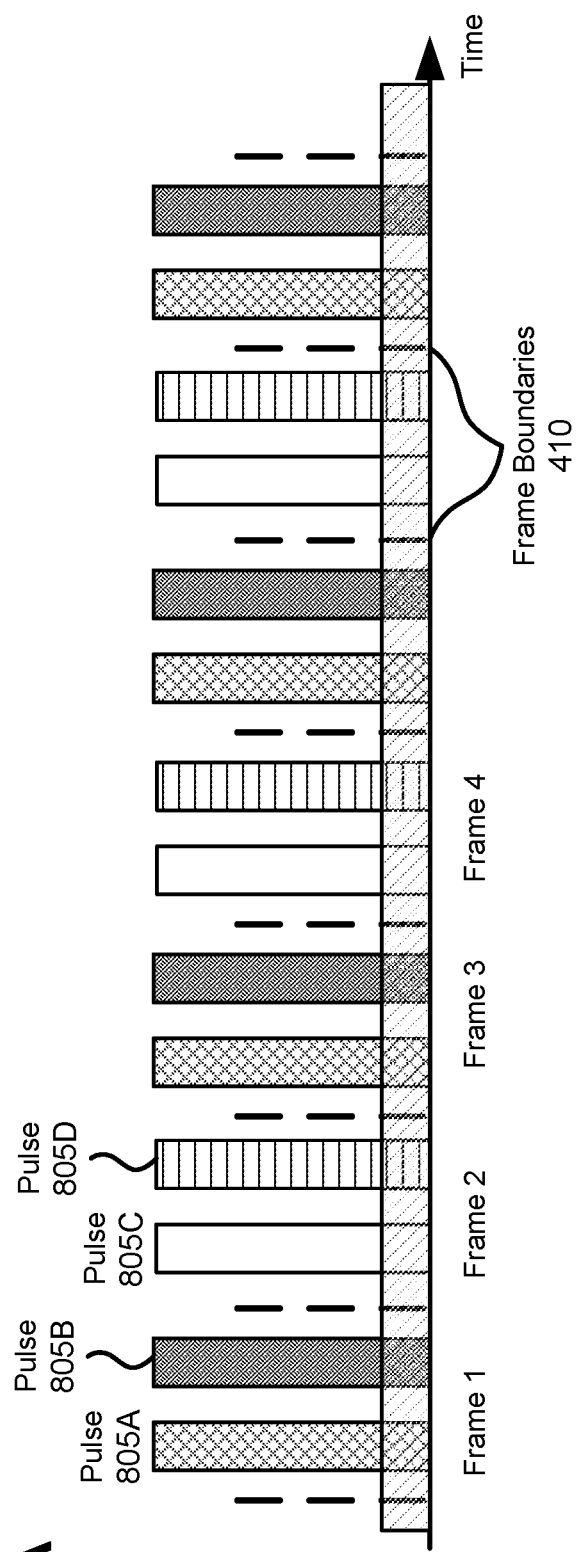
Figure 8B:
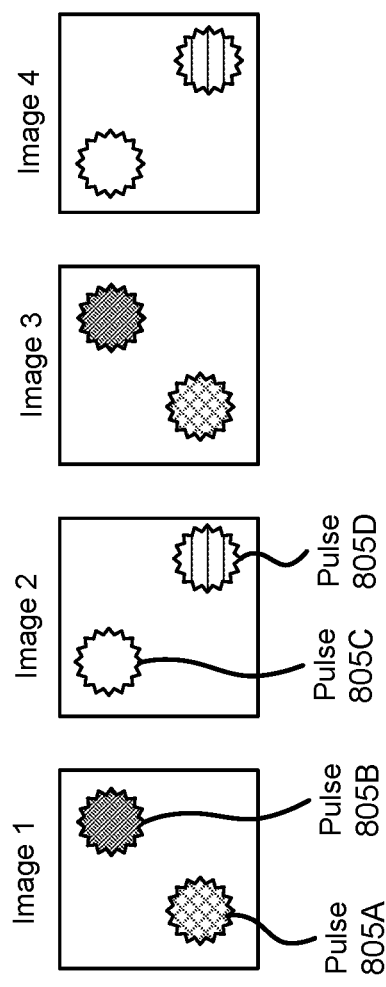

In some embodiments, the remote terminal 100B includes four beacon sources to further increase the misalignment sampling rate. FIG. 8A illustrates a timing diagram with four interleaved beacons (emitted by four different beacon sources). Pulses 805A of the first beacon are illustrated with cross hatching, pulses 805B of the second beacon are illustrated with a dense dot pattern, pulses 805C of the third beacon are illustrated with no fill pattern, and pulses 805D of the fourth beacon are illustrated with horizontal lines. All beacons have a pulse rate equal to half the frame rate and a duty cycle of 10% (although other duty cycles may be used). An advantage of decreasing the duty cycle compared to the previous modulation schemes is that more beacons may be used without the pulse trains overlapping. The first and second pulses fall in the same frames (see images 1 and 3) and the third and fourth pulses fall in the same frames (see images 2 and 4). Thus, each frame includes two pulses that are between the frame boundaries 410.

To create this modulation scheme, the temporal offsets between beacons may be adjusted based on feedback signals (as previously described). By time interleaving two beacons per frame, terminal 100A may sample the terminal misalignment two times per frame. Thus, the misalignment sampling rate may be faster than the frame rate (in this example, the misalignment sampling rate is double the frame rate).

As described above, to distinguish the pulse trains, each of the beacon sources may be physically separated enough that the pulse trains are captured by different pixels of the detector. For example, pulse 805A is captured by pixel (1,20), pulse 805B is captured by pixel (20,1), pulse 805C is captured by pixel (1,1), and pulse 805D is captured by pixel (20,20). Additionally or alternatively, the pulse trains may be different wavelengths. For example, pulse 805A is red, pulse 805B is blue, pulse 805C is green, and pulse 805D is purple. Colors and color combinations may be assigned to arbitrary spectral bands not limited to the visible band. Wavelength-selective filters applied to the receiving detector may be used to modify (e.g., enhance) the detectors ability to distinguish light of specific wavelengths or wavelength groups.

Other modulation schemes with four beacons may achieve a similar result. For example, the beacons do not need to have the same duty cycle, and a duty cycle may be less than 15%. Different duty cycle values assigned to different beacon sources 205 may, along with wavelength, repetition rate, or other modulation features, be used to enable a receiving terminal to distinguish beacon sources.

In some embodiments, more than four beacons are used, which may further increase the misalignment sampling rate. The number of beacons used may be limited by engineering considerations, such as processing speed of the controller 310, the ability to interleave non-overlapping beacons, beacon source 205 space limitations, etc.

Example Method for Aligning FSO Terminals

Figure 9:
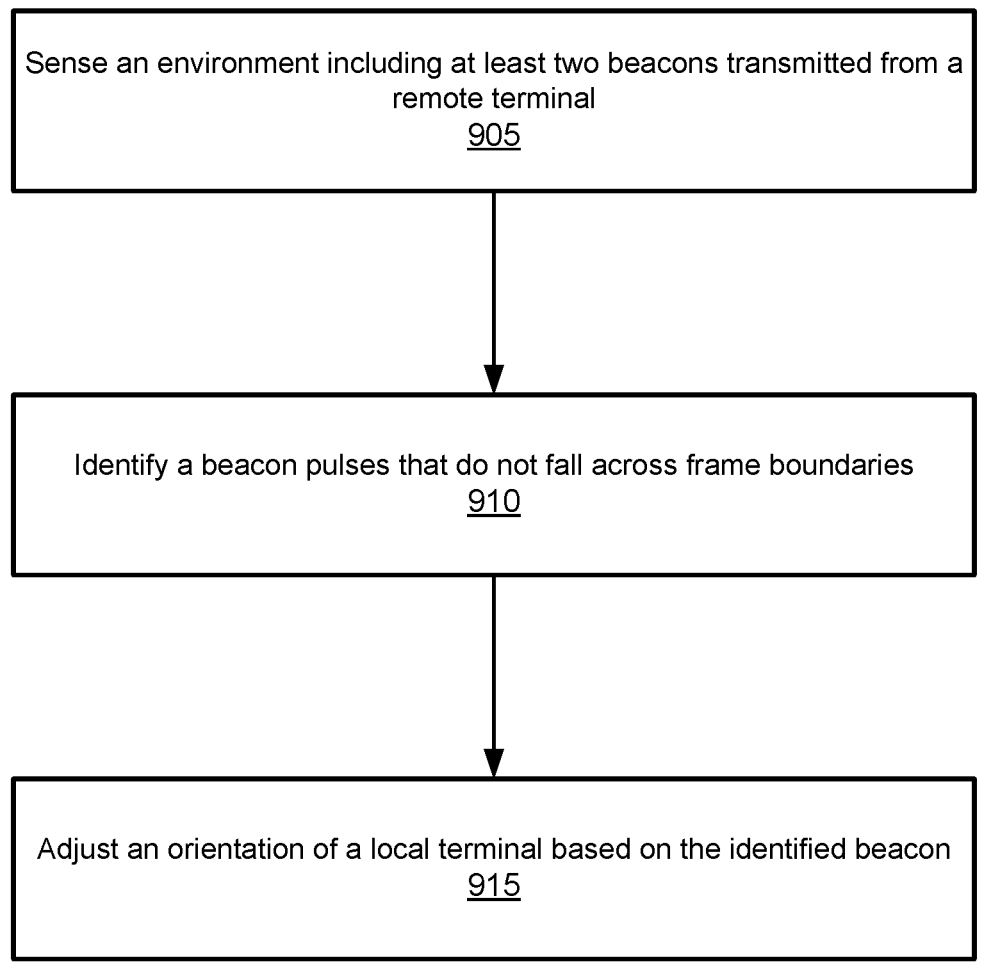
FIG. 9 is a flow chart illustrating a method for a local FSO terminal to align with a remote FSO terminal.

FIG. 9 is a flow chart illustrating a method for a local FSO terminal to align (e.g., point and track) with a remote FSO terminal. The steps of the method may be performed in different orders, and the method may include different, additional, or fewer steps. The steps of the method may be performed by a controller (e.g., controller 310). The controller is a computing device that may execute instructions stored on a computer-readable storage medium to perform operations, such as the steps describe below.

At least two beacons are transmitted from the remote FSO terminal (e.g., by separate sources). The external environment (including the at least two beacons) is sensed 905 at a frame rate, for example a camera captures images at a frame rate. Each beacon comprises a pulse train with pulses that are transmitted at a pulse rate that is equal to the frame rate divided by N, where N is an integer equal to or greater than two. The pulse trains are temporally offset relative to each other so that the pulses from at least one of the pulse trains do not fall across frame boundaries during sensing regardless of a temporal location of the frame boundaries.

The beacon that contains pulses that do not fall across frame boundaries is identified 910. Identifying the beacon may include separating the sensed beacons into the pulse trains and identifying the beacon that contains the pulses that do not fall across frame boundaries based on modulation depth. Separating the sensed beacons into the pulse trains may be based on at least one of: wavelengths of the sensed beacons, the pulse rates, amplitudes of the pulse trains, time durations of pulses of the pulse trains, or the temporal offset. In some embodiments, one or both of the beacons have a modulated wavelength, pulse amplitude, or pulse time duration (also referred to as pulse width) and the beacons are separated based on these modulation schemes. Additionally or alternatively, separating the sensed beacons into the pulse trains may be based on the spatial position of the sensed beacons. For example, each beacon is captured by different pixels of a camera.

An orientation of the local FSO terminal is adjusted 915 based on the identified beacon. Adjusting the orientation may occur at a rate equal to or greater than the frame rate.

Although the above descriptions are described in the context of FSO communications, the above description may be applicable for applications outside of FSO communications, and thus should not be limited to FSO communications. For example, the descriptions may be applicable for remote sensing applications.

ADDITIONAL CONSIDERATIONS

Although the detailed description contains many specifics, these should not be construed as limiting the scope of the invention but merely as illustrating different examples. It should be appreciated that the scope of the disclosure includes other embodiments not discussed in detail above. Various other modifications, changes, and variations which will be apparent to those skilled in the art may be made in the arrangement, operation, and details of the method and apparatus disclosed herein without departing from the spirit and scope as defined in the appended claims. Therefore, the scope of the invention should be determined by the appended claims and their legal equivalents.

Note that the components and terminals illustrated and described can include any electronics and/or computer instructions that may be embodied in digital or analog circuits. This may be implemented using any one or more of Application Specific Integrated Circuits (ASICs), field-programmable gate arrays (FPGAs), and general-purpose computing circuits, along with corresponding memories and computer program instructions for carrying out the described operations. The specifics of these components are not shown for clarity and compactness of description.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules, even if drawn as separate elements in the figures.

Depending on the form of the components, the "coupling" between components may take different forms. For example, dedicated circuitry can be coupled to each other by hard-wiring or by accessing a common register or memory location, for example. Software "coupling" can occur by any number of ways to pass information between software components (or between software and hardware, if that is the case). The term "coupling" is meant to include these examples and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A method for a local free space optical (FSO) terminal to align to a remote FSO terminal, the method comprising:
   sensing an external environment that includes at least two beacons transmitted from the remote FSO terminal, the sensing occurring at a frame rate, wherein:
   each beacon comprises a pulse train with pulses that are transmitted at a pulse rate that is equal to the frame rate divided by N, where N is an integer equal to or greater than two, and
   the pulse trains are temporally offset relative to each other so that the pulses from at least one of the pulse trains do not fall across frame boundaries during sensing regardless of a temporal location of the frame boundaries;
   identifying the beacon that contains pulses that do not fall across frame boundaries; and
   adjusting an orientation of the local FSO terminal based on the identified beacon.

2. The method of claim 1, wherein identifying the beacon that contains pulses that do not fall across frame boundaries comprises:
   separating the sensed beacons into the pulse trains; and
   identifying the beacon that contains pulses that do not fall across frame boundaries based on modulation depth.

3. The method of claim 2, wherein separating the sensed beacons into the pulse trains is based on at least one of: wavelengths of the sensed beacons, the pulse rates, amplitudes of the pulse trains, time durations of pulses of the pulse trains, or the temporal offset.

4. The method of claim 2, wherein separating the sensed beacons into the pulse trains is based on spatial position of the sensed beacons.

5. The method of claim 4, wherein each beacon is captured by different pixels of a camera.

6. The method of claim 1, wherein N equals 2 and a time from a leading edge of one pulse from a pulse train to a trailing edge of a pulse from the other pulse train is less than one frame period.

7. The method of claim 1, wherein the pulses do not overlap.

8. The method of claim 1, wherein pulses from both beacons fall in the same frames.

9. The method of claim 1, wherein pulses from the beacons fall in different frames.

10. The method of claim 1, further comprising adjusting the temporal offset so that pulses from none of the pulse trains fall across frame boundaries.

11. The method of claim 1, wherein the number of beacons is greater than N.

12. The method of claim 11, wherein the number of beacons is equal to 2N.

13. The method of claim 12, wherein N equals two, each beacon is emitted by a separate beacon source, and the beacon sources are spatially separated such that each beacon is captured by different pixels of a camera.

14. The method of claim 1, wherein adjusting the orientation of the local FSO terminal occurs at a rate at least equal to the frame rate.

15. The method of claim 14, wherein adjusting the orientation of the local FSO terminal occurs at a rate greater than the frame rate.

16. The method of claim 1, wherein a duty cycle of a pulse train is less than or equal to 25%.

17. The method of claim 1, wherein at least one beacon has a modulated wavelength, pulse amplitude, or pulse time duration.

18. The method of claim 1, wherein each beacon is emitted by a separate beacon source.

19. A method for a local free space optical (FSO) terminal to align to a remote FSO terminal, the method comprising:

capturing images of an external environment that includes at least two beacons transmitted from the remote FSO terminal, the image capture occurring at a frame rate, wherein:
  each beacon comprises a pulse train with pulses that are transmitted at a pulse rate that is equal to the frame rate divided by N, where N is an integer equal to or greater than two, and
  the pulse trains are temporally offset relative to each other so that the pulses from at least one of the pulse trains do not fall across frame boundaries during sensing regardless of a temporal location of the frame boundaries;
within the images, identifying the beacon that contains pulses that do not fall across frame boundaries; and
adjusting an orientation of the local FSO terminal based on the identified beacon.

20. A free space optical (FSO) terminal configured to transmit at least two beacons to a remote FSO terminal that senses the beacons at a frame rate, wherein each beacon comprises a pulse train with pulses that are transmitted at a pulse rate that is equal to the frame rate divided by N, where N is an integer equal to or greater than two, and the pulse trains are temporally offset relative to each other so that the pulses from at least one of the pulse trains do not fall across frame boundaries during sensing by the remote FSO terminal regardless of a temporal location of the frame boundaries.

* * * * *